United States Patent
Isono

(10) Patent No.: US 7,926,530 B2
(45) Date of Patent: Apr. 19, 2011

(54) DEVICE FOR GENERATING TIRE AIR PRESSURE

(75) Inventor: Hiroshi Isono, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 352 days.

(21) Appl. No.: 12/095,128

(22) PCT Filed: Dec. 15, 2006

(86) PCT No.: PCT/JP2006/325568
§ 371 (c)(1),
(2), (4) Date: May 28, 2008

(87) PCT Pub. No.: WO2007/077754
PCT Pub. Date: Jul. 12, 2007

(65) Prior Publication Data
US 2009/0283191 A1    Nov. 19, 2009

(30) Foreign Application Priority Data
Dec. 28, 2005  (JP) ................... 2005-378043

(51) Int. Cl.
*B60C 23/12* (2006.01)
(52) U.S. Cl. ............... 152/419; 152/421
(58) Field of Classification Search ......... 152/415–421, 152/422
See application file for complete search history.

(56) References Cited

U.S. PATENT DOCUMENTS

| 575,613 | A | * | 1/1897 | Merton | 152/421 |
|---|---|---|---|---|---|
| 591,229 | A | * | 10/1897 | Kehl | 152/419 |
| 900,632 | A | * | 10/1908 | Williams | 152/421 |
| 1,016,364 | A | * | 2/1912 | Rodway et al. | 152/421 |
| 1,788,699 | A | * | 1/1931 | Zinsitz | 152/417 |
| 1,804,192 | A | * | 5/1931 | Wilson | 152/421 |
| 5,975,174 | A | * | 11/1999 | Loewe | 152/415 |
| 2008/0003110 | A1 | * | 1/2008 | Isono | 417/233 |
| 2009/0223615 | A1 | * | 9/2009 | Isono | 152/419 |

FOREIGN PATENT DOCUMENTS

| DE | 143 239 A | 12/1900 |
|---|---|---|
| DE | 296 05 391 U1 | 8/1996 |
| DE | 102 47 700 A1 | 6/2004 |
| FR | 895854 | 2/1945 |
| JP | 57 97707 | 6/1982 |
| JP | 62 4617 | 1/1987 |
| JP | 62 102701 | 6/1987 |
| JP | 63 275409 | 11/1988 |
| JP | 1 109109 | 4/1989 |
| JP | 1 172003 | 7/1989 |
| JP | 5 246218 | 9/1993 |
| JP | 6 507860 | 9/1994 |

(Continued)

*Primary Examiner* — Russell D Stormer
(74) *Attorney, Agent, or Firm* — Oblon, Spivak, McClelland, Maier & Neustadt, L.L.P.

(57) ABSTRACT

A tire-air-pressure-generating apparatus includes an air pump, a pressure control valve, and an adjustment device, which are disposed coaxially in a shaft portion of an axle hub. The air pump includes a pump chamber located in the interior of the axle hub. The pressure control valve and the adjustment device are assembled into a cylinder head, which is assembled airtightly and removably to the axle hub. The cylinder head includes a suction-discharge path, discharge paths, pressure lead paths, and a suction path.

7 Claims, 2 Drawing Sheets

| | FOREIGN PATENT DOCUMENTS | | JP | 2002 514540 | 5/2002 |
|---|---|---|---|---|---|
| JP | 11 509157 | 8/1999 | JP | 2006 298197 | 11/2006 |
| JP | 2000-255228 | 9/2000 | | | |
| JP | 2000 255228 | 9/2000 | * cited by examiner | | |

DEVICE FOR GENERATING TIRE AIR PRESSURE

TECHNICAL FIELD

The present invention relates to an apparatus for generating tire air pressure (hereinafter referred to as a "tire-air-pressure-generating apparatus"), and more particularly, to a tire-air-pressure-generating apparatus configured such that a pump chamber of an air pump is provided in the interior of a hub of a vehicle (e.g., an axle hub or a hub section of a wheel of the vehicle), and capable of supplying compressed air from the pump chamber to a tire air chamber of the wheel through an air path.

BACKGROUND ART

A tire-air-pressure-generating apparatus of such a type is disclosed in, for example, Japanese Patent Application Laid-Open (kokai) No. 1-172003. In the tire-air-pressure-generating apparatus described in this publication, a pump unit is disposed in a hub section of a wheel (composed of a wheel body and a tire); i.e., a hub section (a central portion) of the wheel body), and carries out a reciprocating motion in the axial direction of an axle while one end of a piston of the pump unit is in contact with an inclined surface of a cam member, which is stationary in relation to the rotating wheel. Therefore, as the wheel rotates, the piston of the pump unit reciprocates, thereby yielding a pumping function.

DISCLOSURE OF THE INVENTION

Incidentally, in the tire-air-pressure-generating apparatus described in the above-mentioned publication, a pump chamber of the air pump is provided in the hub section of the wheel body, and an air path (discharge path) for supplying compressed air from the pump chamber to a tire air chamber of the wheel is also provided in the wheel body. Therefore, because of restriction imposed by the position (arrangement) of the pump chamber, the air path (discharge path) cannot be freely formed.

The present invention has been achieved in order to cope with the above-described problem, and provides a tire-air-pressure-generating apparatus configured such that a pump chamber of an air pump is disposed in the interior of a hub of a vehicle (an axle hub or a hub section of a wheel of the vehicle), and capable of supplying compressed air from the pump chamber to a tire air chamber of a wheel through an air path. In the tire-air-pressure-generating apparatus, the air pump is disposed coaxially in relation to a shaft portion of the hub, and a portion of the air path (a portion of a discharge path) is formed in a plug member which is assembled air-tightly and removably to the hub.

In this case, the plug member can be attached to and detached from the hub of the vehicle. Thus, before the plug member is assembled to the hub of the vehicle, a portion of the air path (a portion of the discharge path) can be formed in the plug member. Therefore, a portion of the air path (a portion of the discharge path) can be formed without subjection to restriction imposed by the position (arrangement) of the pump chamber, thereby enhancing the degree of freedom of design of the air path (discharge path).

When the present invention is embodied, an air pressure control valve for controlling compressed air to be supplied from the pump chamber to the tire air chamber through the air path may be assembled to the plug member. In this case, as compared with the case where the air pressure control valve is assembled to the hub of the vehicle, the degree of freedom of design of the air pressure control valve can be enhanced, and the attaching workability of the air pressure control valve can be enhanced.

Further, in this case, the air pressure control valve may have adjustment means for adjusting a set value of pressure for compressed air which is output under control by the air pressure control valve. In this case, the pressure of compressed air to be supplied to the tire air chamber can be set arbitrarily. Also, the adjustment means, together with the air pressure control valve, can be incorporated into the plug member, thereby enhancing the workability of attachment to the hub of the vehicle.

In this case, the adjustment means may include a female screw provided on the plug member, and a male screw which is screw-engaged with the female screw in such a manner as to be able to advance and retreat and can be rotated from outside the plug member. In this case, the adjustment means can be configured simply and at low cost.

BEST MODE FOR CARRYING OUT THE INVENTION

Figure 1:
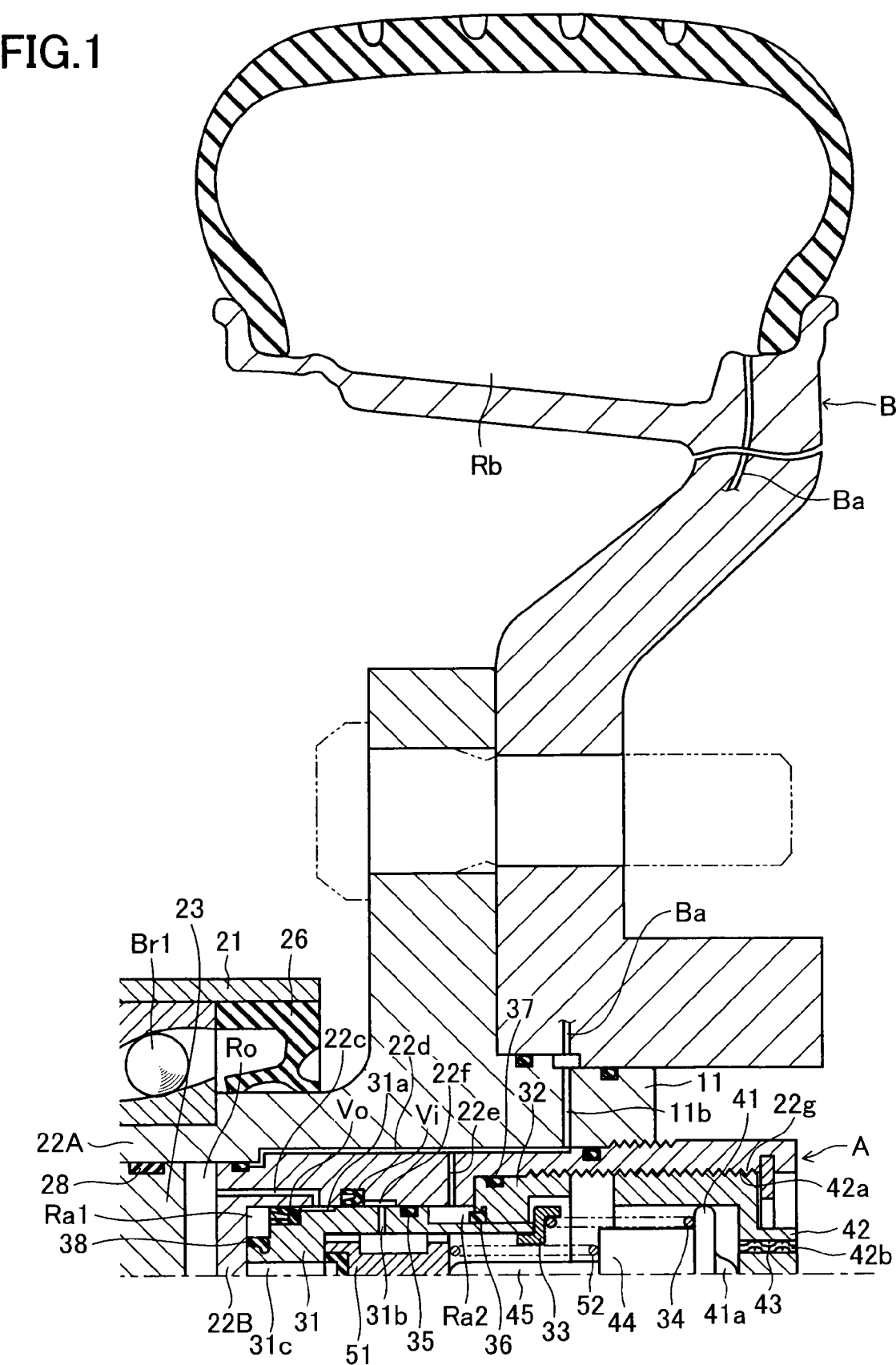
FIG. 1 is a sectional view showing one embodiment of a tire-air-pressure-generating apparatus according to the present invention.
Figure 2:
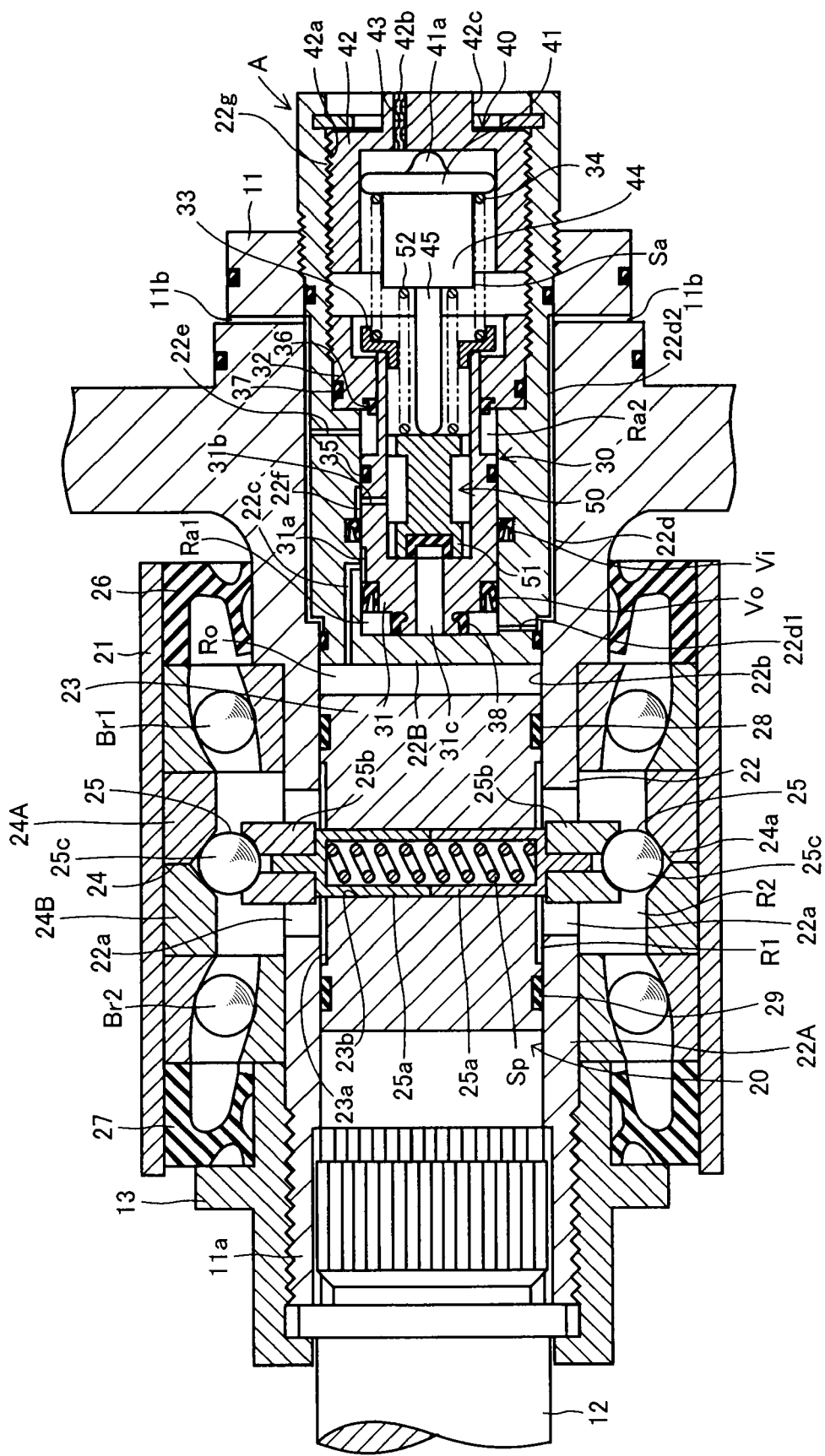
FIG. 2 is a sectional view showing the entirety of the tire-air-pressure-generating apparatus of FIG. 1.

An embodiment of the present invention will next be described with reference to the drawings. FIGS. 1 and 2 show an embodiment in which a tire-air-pressure-generating apparatus A of the present invention is assembled to an axle hub 11 which rotates with a wheel B. A drive axle 12 is splined to the inboard end of the axle hub 11, whereby the axle hub 11 and the drive axle 12 are connected for torque transmission. The connection between the axle hub 11 and the drive axle 12 is ensured by means of a lock nut 13.

The tire-air-pressure-generating apparatus A includes an air pump 20, a pressure control valve 30, and an adjuster 40, which are coaxially disposed in a shaft portion (rotation shaft) 11a of the axle hub 11. The tire-air-pressure-generating apparatus A also includes a relief valve 50 coaxially disposed inside the pressure control valve 30. Of the air pump 20, the pressure control valve 30, and the adjuster 40, the air pump 20 is disposed at the furthest inboard position. The pressure control valve 30 is disposed between the air pump 20 and the adjuster 40. Of the air pump 20, the pressure control valve 30, and the adjuster 40, the adjuster 40 is disposed at the furthest outboard position.

The air pump 20 can supply compressed air, generated through rotation of the wheel B, to a tire air chamber Rb of the wheel B. The air pump 20 includes a nonrotatable cylindrical member 21; a rotatable cylinder 22 formed on the shaft portion 11a of the axle hub 11; a piston 23, which is a reciprocating body; a cam member 24; and a pair of cam followers 25.

The cylindrical member 21 is supported nonrotatably by a support member (not shown). The cylinder 22 is supported in the interior of the cylindrical member 21 rotatably about the axis of the wheel B and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is airtightly and removably screw-engaged with an outboard end portion of the cylinder body 22A. The cylinder body 22A is formed integral with the shaft portion 11a of the axle hub 11. The cylinder body 22A has a pair of axially elongated holes 22a and a cylinder bore 22b extending in the axial direction. The cylinder head 22B is a closed-bottomed cylindrical plug member which is assembled airtightly and removably to the axle hub 11. The cylinder head 22B has a suction-discharge path 22c, discharge paths 22d, pressure lead paths 22e, and a suction path 22f.

The paired axially elongated holes 22a collectively serve as guide means for guiding the piston 23 and the cam followers 25 in such a manner that these members are rotatable unitarily with the cylinder 22 and can reciprocate in the axial direction. The paired axially elongated holes 22a are spaced 180 degrees apart from each other in the circumferential direction of the cylinder 22. The cylinder bore 22b accommodates the piston 23; is closed at its outboard end portion by the cylinder head 22B; and forms a pump chamber Ro in cooperation with the cylinder head 22B and the piston 23.

The suction-discharge path 22c always communicates with a communication path 31a provided in a valve body 31 of the pressure control valve 30. The suction-discharge path 22c can lead air into the pump chamber Ro through a suction check valve Vi (composed of an annular seal member having a V-shaped cross section) attached to the cylinder head 22B and can lead air out from the pump chamber Ro through a discharge check valve Vo (composed of an annular seal member having a V-shaped cross section) attached to the valve body 31 of the pressure control valve 30.

The discharge paths 22d lead compressed air discharged through the discharge check valve Vo, to discharge paths 11b provided in the axle hub 11. Each of the discharge paths 22d is composed of a radially extending communication hole 22d1 provided in the cylinder head 22B and a communication groove 22d2 provided on the outer circumference of the cylinder head 22B. The discharge paths 11b provided in the axle hub 11 communicate with a tire air chamber Rb through a communication path Ba provided in the wheel B.

Each of the pressure lead paths 22e is a radially extending communication hole provided in the cylinder head 22B and can lead the pressure of compressed air in the discharge paths 22d to an air chamber Ra2 formed between the valve body 31 of the pressure control valve 30 and a stopper 32. The suction path 22f always communicates with an atmosphere communication path 31b provided in the valve body 31 of the pressure control valve 30. The communication between the suction path 22f and the communication path 31a provided in the valve body 31 of the pressure control valve 30 can be established and cut off. The atmosphere communication path 31b provided in the valve body 31 always communicates with the atmosphere through an atmosphere communication path 42b formed in an adjustment screw 42 of the adjuster 40.

The piston 23 is inserted into the cylinder bore 22b of the cylinder 22 via a pair of annular seal members 28 and 29 and is attached to the cylinder 22 in a unitarily rotatable manner and in such a manner as to be able to axially reciprocate. The piston 23 has an annular groove 23a and a radially extending through hole 23b. The paired annular seal members 28 and 29 are spaced a predetermined distance apart from each other in the axial direction and intervene between the piston 23 and the cylinder 22 at respective, axial end portions of the piston 23, thereby providing an airtight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a formed in the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. This oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the axial direction, and is attached unitarily (in an axially immovable manner and in a nonrotatable manner) to the cylindrical member 21. The cam member 24 is disposed coaxially with the cylinder 22. The cam member 24 has an annular cam portion 24a whose axial position varies. The cam portion 24a is a cam groove, into which a ball 25c of each cam follower 25 is fitted. The cam portion 24a has a cam face which receives a load along the axial direction (a load along the horizontal direction in the drawings) and a load along the radial direction (a load along the vertical direction in the drawings) from the ball 25c of the cam follower 25. This cam face has a V-shaped cross section and has an even number of geometric cycles (e.g., two geometric cycles) along the circumferential direction of the cylinder 22.

The cam followers 25 each include a shaft 25a divided into two pieces within the piston 23, and a roller 25b and the ball 25c attached to the shaft 25a. The shaft 25a of each of the cam followers 25 is installed in the through hole 23b of the piston 23 in such a manner as to be movable in a radial direction of the piston 23. The cam followers 25 each are engaged with the cam portion (cam groove) 24a of the cam member 24, at the end portion extending in the radial direction (that is, at the ball 25c). Through relative rotation in relation to the cam member 24, the cam followers 25 can move in the axial direction of the piston 23.

The shafts 25a each serve as a load transmission element, which is installed in the through hole 23b of the piston 23 in such a manner as to be movable in the radial direction of the piston 23 (the axial direction of the through hole 23b). The compression coil spring Sp installed within the shafts 25a urges the shafts 25a in a radially outward direction of the piston 23. The shafts 25a are support bodies which rotatably support the rollers 25b. The rollers 25b are rotatably supported at respective small-diameter end portions projecting from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the axial movement of the cam followers 25. Each of the rollers 25*b* has a hemispherically recessed bearing portion at its axially outer end. The bearing portions of the rollers 25*b* rollably support the respective balls 25*c*.

Each of the balls 25*c* is a protruded portion of the cam follower 25, which is rollably supported by the roller 25*b* and is rollably engaged with the cam portion (cam groove) 24*a* of the cam member 24. Each of the balls 25*c* is subject to repulsion force of the compression coil spring Sp via the shaft 25*a* and the roller 25*b*, and is resiliently engaged with the cam portion (cam groove) 24*a* of the cam member 24 without clearance.

The compression coil spring Sp is a pressing means for pressing the balls 25*c* of the cam followers 25 in a radial direction of the piston 23 toward the cam portion (cam groove) 24*a* of the cam member 24. The compression coil spring Sp is installed in closed-bottomed mounting holes of the shafts 25*a* of the cam followers 25 under predetermined preload.

In the thus-configured air pump 20, when the cylinder 22 (the axle hub 11) rotates with the valve body 31 of the pressure control valve 30 maintained in the illustrated position, the piston 23 and the cam followers 25 rotate unitarily with the cylinder 22 and undergo relative rotation in relation to the cam member 24 to thereby move axially. Accordingly, the rotary motion of the cylinder 22 can be converted to the reciprocating motion of the piston 23. The reciprocating motion of the piston 23 can increase and decrease the volume of the pump chamber Ro. Thus, air can be introduced into the pump chamber Ro through the suction check valve Vi, the communication path 31*a*, and the suction-discharge path 22*c*. Also, air can be discharged from the pump chamber Ro through the suction-discharge path 22*c*, the communication path 31*a*, and the discharge check valve Vo.

The pressure control valve 30 serves as restriction means for restricting the supply of compressed air from the pump chamber Ro to the tire air chamber Rb when the pressure of the compressed air reaches a first set value P1. The pressure control valve 30 is assembled into the cylinder head 22B. The pressure control valve 30 includes the valve body 31, the stopper 32, and a compression coil spring 34. The compression coil spring 34 is engaged with the valve body 31 via a spring retainer 33 and is capable of controlling the moving timing and moved position of the valve body 31. The adjuster 40 can adjust the urging force applied to the valve body 31 by the compression coil spring 34.

The valve body 31 is assembled airtightly and axially movably into the cylinder head 22B via the discharge check valve Vo and an annular seal member 35, which are attached to the outer circumference of the valve body 31. The valve body 31 forms an air chamber Ra1, which communicates with the discharge paths 22*d*, in cooperation with the cylinder head 22B, and forms the air chamber Ra2, which communicates with the discharge paths 22*d* through the pressure lead paths 22*e*, in cooperation with the stopper 32. The stopper 32 intervenes airtightly between the valve body 31 and the cylinder head 22B such that an annular seal member 36 is attached to its inner circumference and such that an annular seal member 37 is attached to its outer circumference. The stopper 32 is screw-engaged with the cylinder head 22B at an outboard end portion of the outer circumference thereof, thereby being united with the cylinder head 22B.

In the pressure control valve 30, when the pressure of compressed air supplied from the pump chamber Ro to the tire air chamber Rb is less than the first set value P1, the valve body 31 is maintained at the illustrated position, so that the suction check valve Vi cuts off the communication between the communication path 31*a* and the suction path 22*f*. Thus, the suction check valve Vi permits air flow from the atmosphere into the pump chamber Ro, and the discharge check valve Vo permits air flow from the pump chamber Ro into the tire air chamber Rb. Further, the suction check valve Vi cuts off the communication between the communication path 31*a* and the suction path 22*f* to thereby restrict air flow from the pump chamber Ro to the atmosphere, and the discharge check valve Vo restricts air flow from the tire air chamber Rb to the pump chamber Ro.

Further, in the pressure control valve 30, when the pressure of compressed air supplied from the pump chamber Ro to the tire air chamber Rb is equal to or greater than the first set value P1, the valve body 31 maintains its axial position shifted from the illustrated position by a predetermined amount, against the urging force of the compression coil spring 34 (more specifically, the sum of the urging force of the compression coil spring 34 and the urging force of a compression coil spring 52, which will be described later), so that the communication path 31*a* communicates with the suction path 22*f* irrespective of the suction check valve Vi; that is, the suction check valve Vi has lost its function (reverse-flow prevention function). Therefore, the communication path 31*a* communicates with the suction path 22*f*, to thereby permit air flow between the pump chamber Ro and the atmosphere. Furthermore, the discharge check valve Vo restricts air flow between the discharge paths 22*d* and the communication path 31*a*; that is, between the pump chamber Ro and the tire air chamber Rb. Notably, in a state where the valve body 31 maintains its axial position shifted from the illustrated position by a predetermined amount against the urging forces of the compression coil spring 34 and the like, the shoulder portion of the valve body 31 is in contact with the annular seal member 36 attached to the inner circumference of the stopper 32.

The adjuster 40 includes a spring support 41 which supports the other end portion (a stationary end portion which does not move even when the valve body 31 moves) of the compression coil spring 34 of the pressure control valve 30; and the adjustment screw 42, which can adjust the position of the spring support 41. The spring support 41 is a movable portion of a stroke sensor Sa which detects the position of the spring support 41 through conversion of the position to an electrical signal. A hemispherically protruded portion 41*a* of the spring support 41 is rotatably engaged with the adjustment screw 42.

The adjustment screw 42 is a member formed separately from the spring support 41, and includes a male screw portion 42*a* and the atmosphere communication path 42*b*. The male screw portion 42*a* of the adjustment screw 42 is screw-engaged with a female screw portion 22*g* of the cylinder head 22B in such a manner as to be able to advance and retreat. The adjustment screw 42 also serves as a cap, and can be rotated from the outside of the vehicle for adjustment. A hexagonal head portion 42*c* is formed at the outer end portion of the adjustment screw 42 such that a manually operable adjusting tool (not shown) can be removably attached thereto. Notably, a filter 43 is disposed in the atmosphere communication path 42*b*.

The relief valve 50 is adapted to release compressed air to the atmosphere when the pressure of compressed air supplied from the pump chamber Ro to the tire air chamber Rb; that is, the pressure within the air chamber Ra1, is equal to or greater than a second set value P2 which is greater than the first set value P1. The relief valve 50 includes a valve body 51 which can open and close a relief path 31*c* provided in the valve body 31; and a compression coil spring 52 whose one end portion (a movable end portion) is engaged with the valve body 51 and which determines the timing at which the valve body 51 moves (i.e., the timing at which the relief path 31c is opened).

The valve body 51 is installed in the valve body 31 of the pressure control valve 30 in such a manner as to be movable in the axial direction. The valve body 51 is in contact with a rod portion 45 of the stroke sensor Sa (a stationary portion of the stroke sensor Sa which can move axially in relation to the movable portion of the stroke sensor Sa with very little resistance). The other end portion (a stationary end portion) of the compression coil spring 52 is engaged with the spring support 44, which is integral with the above-described spring support 41. The urging force of the compression coil spring 52 which acts on the valve body 51 can be adjusted by means of the adjuster 40. At the time of adjustment by means of the adjuster 40, the urging force of the compression coil spring 34 which acts on the valve body 31 of the pressure control valve 30 is adjusted simultaneously. Thus, the above-described first set value P1 and second set value P2 can be adjusted simultaneously.

In this relief valve 50, the communication between the relief path 31c provided in the valve body 31 of the pressure control valve 30 and the air chamber Ra1 can be established and cut off by an annular seal member 38 attached to the valve body 31. Thus, only in a state where the valve body 31 of the pressure control valve 30 moves in the axial direction against the urging force of the compression coil spring 34 to thereby establish the communication between the air chamber Ra1 and the relief path 31c along the seal member 38, the pressure within the air chamber Ra1 is transmitted to the relief path 31c, so that the relief valve 50 can operate.

In the tire-air-pressure-generating apparatus A of the present embodiment having the above-described structure, the cylinder head 22B, which is assembled airtightly and removably to the axle hub 11, has the suction-discharge path 22c communicating with the pump chamber Ro of the air pump 20; the discharge paths 22d and the pressure lead paths 22e both communicating with the suction-discharge path 22c via the discharge check valve Vo; and the suction path 22f communicating with the suction-discharge path 22c via the suction check valve Vi.

Incidentally, the cylinder head 22B can be attached to and detached from the axle hub 11; thus, before the cylinder head 22B is assembled to the axle hub 11, the suction-discharge path 22c, the discharge paths 22d, the pressure lead paths 22e, the suction path 22f, etc. (a portion of the air path) can be formed in the cylinder head 22B. Therefore, the suction-discharge path 22c, the discharge paths 22d, the pressure lead paths 22e, the suction path 22f, etc. (a portion of the air path) can be formed without subjection to restriction imposed by the position (arrangement) of the pump chamber Ro of the air pump 20, thereby enhancing the degree of freedom of design of the suction-discharge path 22c, the discharge paths 22d, the pressure lead paths 22e, the suction path 22f, etc. (a portion of the air path).

Further, in the present embodiment, the pressure control valve 30 (air pressure control valve), which controls compressed air to be supplied from the pump chamber Ro of the air pump 20 to the tire air chamber Rb of the wheel B through the suction-discharge path 22c, the discharge paths 22d, etc., is assembled to the cylinder head 22B, which has a closed-bottomed tubular form and can be attached to and detached from the axle hub 11. Therefore, as compared with the case where the air pressure control valve is assembled to the axle hub 11, the degree of freedom of design of the pressure control valve 30 can be enhanced, and the attaching workability of the pressure control valve 30 can be enhanced.

Further, in the present embodiment, the cylinder head 22B has the adjuster 40 for adjusting a set value of pressure (first set value P1) for compressed air which is output under control by the pressure control valve 30. Therefore, the pressure of compressed air to be supplied to the tire air chamber Rb of the wheel B can be set arbitrarily. Also, the adjuster 40, together with the pressure control valve 30, can be incorporated into the cylinder head 22B, thereby enhancing the workability of attachment to the axle hub 11.

Further, in the present embodiment, the adjuster 40 includes the female screw portion 22g provided on the cylinder head 22B, and the male screw portion 42a which is screw-engaged with the female screw portion 22g in such a manner as to be able to advance and retreat and can be rotated from outside the cylinder head 22B. Therefore, the adjuster 40 can be configured simply and at low cost.

Further, in the present embodiment, when the pressure of compressed air supplied from the pump chamber Ro of the air pump 20 to the tire air chamber Rb is equal to or greater than the first set value P1, the pressure control valve 30 permits air flow between the pump chamber Ro and the atmosphere. Therefore, the load required to drive the air pump 20 can be reduced.

Further, the pressure control valve 30 includes the valve body 31 and the compression coil spring 34. The adjuster 40 includes the spring support 41 for supporting the other end portion (a stationary end portion) of the compression coil spring 34 and the adjustment screw 42 capable of adjusting the position of the spring support 41, and the adjustment screw 42 is formed separately from the spring support 41. This structure enables the adjustment screw 42 to be rotated in relation to the spring support 41, without transmitting rotation of the adjustment screw 42 to the compression coil spring 34 supported by the spring support 41.

In the present embodiment, there is provided the relief valve 50, which releases compressed air to the atmosphere when the pressure within the discharge paths 11b is equal to or greater than the second set value P2 greater than the first set value P1. Therefore, it is possible to prevent the pressure within the tire air chamber Rb from becoming excessively high. Further, since the relief valve 50 is disposed inside the pressure control valve 30, the tire-air-pressure-generating apparatus A can be made compact.

In the present embodiment, the spring support 41, which supports the compression coil spring 34 of the pressure control valve 30, and the spring support 44, which supports the compression coil spring 52 of the relief valve 50, are integrated together. Therefore, the first set value P1 and the second set value P2 (the urging force of the compression coil spring 34 and the urging force of the compression coil spring 52) can be adjusted simultaneously by the adjuster 40, whereby the adjusting work can be simplified.

In the present embodiment, there is provided the stroke sensor Sa, which detects the positions of the spring supports 41 and 44 through conversion of position adjustment of the spring supports 41 and 44 to an electrical signal. Therefore, the positions of the spring supports 41 and 44 can be detected accurately. Further, since the stroke sensor Sa is designed to use the spring supports 41 and 44 as a movable portion of the sensor, the structure of the stroke sensor Sa can be simplified.

In the present embodiment, the air pump 20, the pressure control valve 30, and the adjuster 40 are coaxially disposed in relation to the axle hub 11, which rotates together with the wheel B; and the pressure control valve 30 is disposed between the air pump 20 and the adjuster 40. Therefore, air-tightness of the pressure control valve 30 can be readily secured. Further, since the adjuster 40 is disposed at the furthest outboard position among the air pump 20, the pressure control valve 30, and the adjuster 40, the adjuster 40 can be operated easily, and thus, maintainability is improved.

In the present embodiment, the air pump 20, the pressure control valve 30, and the adjuster 40 are assembled to the axle hub 11, which rotates together with the wheel B; and the drive axle is coupled to the inboard end of the axle hub 11 for torque transmission. Therefore, the tire-air-pressure-generating apparatus A can be neatly assembled into the axle hub 11, which supports the wheel B and rotates together with the wheel B, whereby the axle hub 11 can be utilized effectively.

In the above-described embodiment, the tire-air-pressure-generating apparatus is configured such that the adjustment screw 42 is axially moved by use of an adjusting tool (not shown) which can be removably attached to the hexagonal head portion 42c of the adjustment screw 42 and can be operated manually. However, the tire-air-pressure-generating apparatus may be configured such that the adjustment screw 42 is axially moved by means of an electric motor with a speed reducer (not shown), which electric motor can be operated by a switch provided near the driver's seat.

In the above-described embodiment, the tire-air-pressure-generating apparatus is configured such that compressed air from the air pump 20 is supplied directly to the tire air chamber Rb. However, the tire-air-pressure-generating apparatus may be configured such that compressed air from the air pump is supplied to a pressure accumulation chamber (air chamber) of an accumulator and is accumulated therein, and the compressed air accumulated in the accumulator is supplied to the tire air chamber via a control valve (which is controlled in accordance with the tire air pressure).

According to the above-described embodiment, the present invention is embodied as the tire-air-pressure-generating apparatus A configured such that the pump chamber Ro of the air pump 20 is provided in the interior of the axle hub 11 of the vehicle. However, the present invention can be embodied, similarly or with appropriate modifications, as a tire-air-pressure-generating apparatus configured such that the pump chamber of the air pump is provided in the interior of a hub section of a wheel.

The invention claimed is:
1. A tire-air-pressure-generating apparatus, comprising:
an air pump having a pump chamber, the pump chamber disposed in an interior of a hub of a vehicle, the pump chamber configured to supply compressed air to a tire air chamber of a wheel through an air path,
wherein the air pump is disposed coaxially in relation to a shaft portion of the hub, and a portion of the air path is formed in a plug member which is assembled airtightly and removably to the hub,
wherein the plug member is disposed coaxially with respect to the air pump and shaft portion of the hub.
2. A tire-air-pressure-generating apparatus according to claim 1, wherein an air pressure control valve for controlling compressed air to be supplied from the pump chamber to the tire air chamber through the air path is assembled to the plug member.
3. A tire-air-pressure-generating apparatus according to claim 2, wherein the air pressure control valve has adjustment means for adjusting a set value of pressure for compressed air which is output under control by the air pressure control valve.
4. A tire-air-pressure-generating apparatus according to claim 3, wherein the adjustment means includes a female screw provided on the plug member, and a male screw which is screw-engaged with the female screw in such a manner as to be able to advance and retreat and can be rotated from outside the plug member.
5. The tire-air-pressure-generating apparatus according to claim 4, wherein the air pressure control valve and the adjustment means are coaxially disposed in the shaft portion of the hub.
6. The tire-air-pressure-generating apparatus according to claim 1, further comprising a relief valve configured to release compressed air to the atmosphere when pressure within a discharge path is equal to or greater than a predetermined value.
7. The tire-air-pressure-generating apparatus according to claim 1, wherein each of the pump chamber and the plug member is disposed outside of the tire air chamber.

* * * * *